Jan. 17, 1961  R. G. BEACH  2,968,475
SCALE MECHANISM
Filed May 18, 1956  3 Sheets-Sheet 1

INVENTOR.
ROBERT G. BEACH
BY
Buckhorn and Cheatham
ATTORNEYS

Jan. 17, 1961    R. G. BEACH    2,968,475
SCALE MECHANISM
Filed May 18, 1956    3 Sheets-Sheet 2

INVENTOR.
ROBERT G. BEACH
BY
*Buckhorn and Cheetham*
ATTORNEYS

Jan. 17, 1961  R. G. BEACH  2,968,475
SCALE MECHANISM
Filed May 18, 1956  3 Sheets-Sheet 3

INVENTOR.
ROBERT G. BEACH
BY
Buckhorn and Cheatham
ATTORNEYS

United States Patent Office 2,968,475
Patented Jan. 17, 1961

2,968,475

SCALE MECHANISM

Robert G. Beach, Cottage Grove, Oreg.; Neil Brown, administrator of said Robert G. Beach, deceased, assignor to Beach Gauge Company, Cottage Grove, Oreg., a corporation of Oregon Filed May 18, 1956, Ser. No. 585,780

8 Claims. (Cl. 265—71)

This invention relates to a scale mechanism and more particularly to a scale for heavy duty use in which the weighing platform must not only withstand heavy stresses due to either balanced or unbalanced loads being weighed but must also withstand heavy stresses parallel to the upper surface of the weighing platform caused by tipping of the platform and by loads applied parallel to such surface while, at the same time, providing accurate weight readings.

The scale mechanism of the present invention is particularly suitable for employment on trucks, such as logging trucks and trailers, to give an indication of the weight on the truck or trailer. That is to say, the scale of the present invention may be employed in logging operations as part of the log supporting structure during loading and transport of the logs, one of the scale mechanisms preferably forming part of the turntable platform for the log bunk on the truck and another scale mechanism forming part of the turntable platform for the log bunk on the trailer.

Prior scale mechanisms for logging trucks have been for the most part of the hydraulic type in which the pressure within one or a plurality of hydraulic force measuring elements is indicated upon a gauge in order to give an approximate indication of the weight upon a log bunk. While such scale mechanisms are reasonably accurate when the log truck and trailer are upon level ground, and the load thereon is balanced, any substantial inclination of the surface upon which the truck or trailer is positioned and any substantial unbalance of the load upon a log bunk has resulted in erroneous weight readings.

In accordance with the present invention, a scale mechanism having scale arms is employed to reduce the force of the weight upon the scale platform and transmit such force to a force measuring cell, preferably of the type which produces an electrical voltage or current variation proportional to the force upon the cell. Such scale mechanisms are preferably built into the turntable platform supporting the log bunk of the truck, or the trailer, or both, and the structure is such that the forces parallel to the upper surface of the platform due to pulling the trailer through the logs themselves are transmitted to the frame of the truck without substantially effecting the scale mechanism and also forces due to unbalanced loads on the scale mechanism are compensated for so that accurate weight readings are obtained even with such unbalanced loads. The same mechanism also averages the forces upon the scale mechanism when the truck or trailer, or both, are on uneven ground so as to produce accurate weight readings when the scale is subjected to such uneven forces due to uneven ground. Furthermore, the structure of the scale mechanisms of the present invention are such that accurate weight indications may be obtained even when the truck and trailer are in motion over uneven ground.

It is therefore an object of the present invention to provide an improved scale mechanism of the platform type in which the accuracy of the weight indications are not adversely effected by unbalanced weights on the platform or forces parallel to the upper surface of the platform.

Another object of the invention is to provide a scale mechanism particularly siutable for being built into the turntable platform supporting the log bunk of a logging truck or trailer and which will provide accurate weight readings under adverse conditions provided by unbalanced loads and uneven ground upon which the truck and trailer are supported.

A further object of the invention is to provide a scale structure in which force reducing scale arms are employed and supported in a manner such that unbalanced loads and forces parallel to the upper surface of the weight receiving platform of the scale mechanism do not adversely effect the accuracy of the weight indications.

A still further object of the invention is to provide a weighing scale of the platform type in which elongated fulcrum members are employed for force reducing scale arms and forces parallel to such fulcrum members are transmitted directly from the platform to the base for the weighing scale without being transmitted through such scale arms.

Other objects and advantages of the invention will appear in the following description of a preferred embodiment shown in the attached drawings of which:

Figure 3:
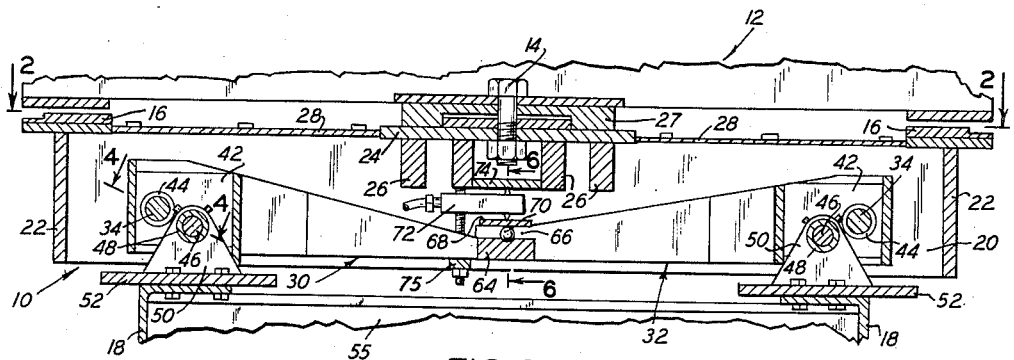
Fig. 3 is a vertical section taken on the line 3—3 of Fig. 2.
Figure 2:
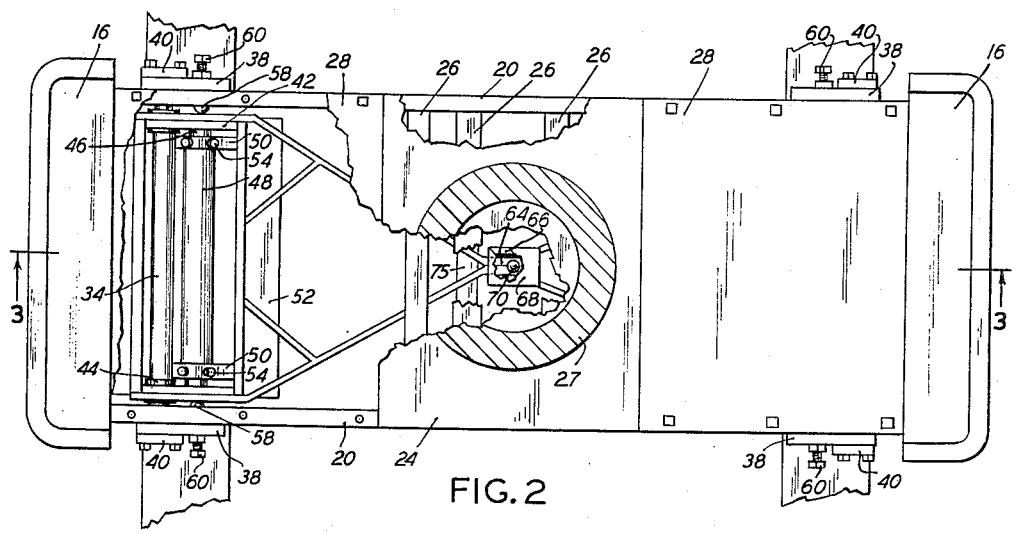
Fig. 2 is a top plan view of a scale mechanism in accordance with the present invention with parts broken away to show internal structure and on a larger scale than Fig. 1.

Referring more particularly to the drawings, the scale mechanism of Figs. 1 to 7 includes a turntable platform 10 which supports a log bunk 12 of a truck or trailer, the log bunk 12 being pivotally secured to the center of the scale platform 10 by means of a king bolt 14 as shown in Fig. 3. The turntable 10 has the usual wear plate 16 at its ends and is supported through scale arms and bearings, described below, on side rails 18 which may be the side rails of either the truck or trailer. For weighing a complete load of logs, there must be a scale mechanism on both the truck and the trailer.

The turntable platform 10 is of rectangular shape having depending side walls 20 and end walls 22. The turntable also has a center top plate 24 reinforced by heavy bars 26 extending between the side walls 20 below the top plate 24 for supporting a bearing member 27 forming part of the log bunk 12. The structure of the turntable platform 10, thus far described, is integrally welded together and has removable cover plates 28 between the center plate 24 and the wear plate 16. The load on the scale platform 10 is supported primarily upon the center plate 24, although a laterally unbalanced load upon the log bunk 12 causes part of the load to be transmitted to the turntable platform 10 at one end or the other through a wear plate 16.

The scale mechanism also includes a pair of scale arms 30 and 32 which may be constructed of metal plates welded together. The arms 30 and 32 each have their outer ends pivoted to the side walls 20 of the turntable about a horizontal axis extending transversely of the scale platform, i.e., longitudinally of the truck or trailer, by means of a fulcrum shaft 34. As shown most clearly in Fig. 4, each shaft 34 is journaled in bushings 36 extending through and secured in the side walls 20, the side walls being provided with reinforcing blocks 38 welded to the side walls and the bushing 36 also extending through such reinforcing blocks. The shafts 34 are removably held in position against end movement by small plates 40 suitably bolted to the reinforcing blocks 38. The arms 30 and 32 also have reinforcing blocks 42 surrounding the shafts 34 and have bushings 44 extending through the side plates of such arms and the reinforcing blocks 42, the bushings 44 also forming journals for the arms on the shafts 34. The arms 30 and 32 are each supported on a shaft 46 extending parallel to a shaft 34. The shafts 46 are adjacent but spaced longitudinally of the platform from the shafts 34 and are received in tubular members 48 extending between spaced standards 50 secured to base plates 52 at each end of the turntable platform and which are in turn secured to the side rails 18 of the truck or trailer. The shafts 46 are secured in the standards 50 by set screws 54. The standards 50, tubular members 48 and shafts 46 form supporting structures extending upwardly from the supporting base for the scale platform and in the mechanism of Figs. 1 to 7, it is important that such supporting structures at opposite ends of the turntable platform 10 be maintained a definite distance apart. The base plates 52 will, therefore, ordinarily be secured to the rails 18 of a truck or trailer adjacent a crosspiece 55 such as indicated in Fig. 3, although it will be apparent that reinforcing or bracing members extending between the base plates 52 may be employed, if found necessary.

Figure 5:
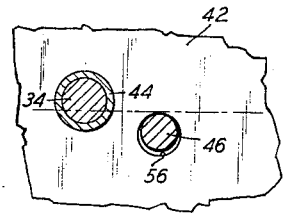
Fig. 5 is a fragmentary vertical section taken on the line 5—5 of Fig. 4.
Figure 6:
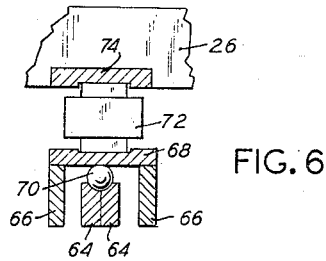
Fig. 6 is a fragmentary vertical section on an enlarged scale taken approximately on the line 6—6 of Fig. 3.
Figure 7:
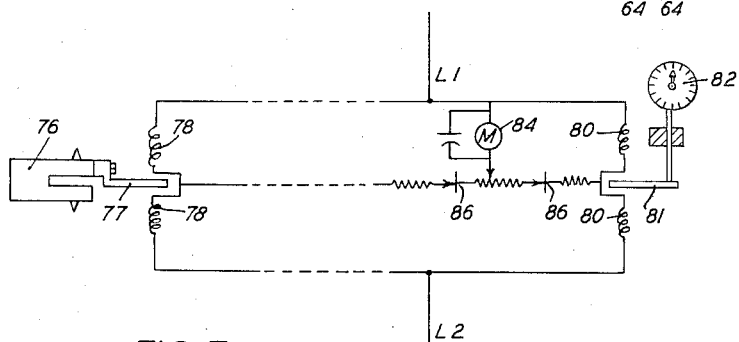
Fig. 7 is a schematic diagram of the electrical system for a force measuring cell which may be employed in the present invention.

The side plates of the arms 30 and 32, and also the reinforcing blocks 42 secured to such side plates, have enlarged holes 56, shown most clearly in Fig. 5, for receiving the shaft 46, the shaft 46 being, for example, 1¼-inch in diameter and the holes 56 being 1⅜-inch in diameter so that the top surface of the hole 56 rests on the top surface of the shaft 46 to provide clearance permitting limited relative movement of the arms laterally of the shafts 46. The weight on the turntable platform, however, causes the holes in the arms 30 and 32 to remain substantially centered laterally of the shafts and any slight movement of one arm laterally of a shaft 46 is compensated for by a similar movement of the other arm laterally of its shaft 46. The shafts 34 and 46 constitute fulcrums for the arms 30 and 32 such that weight on the turntable platform 10 tends to pivot the arms about the shafts 46.

The turntable platform 10 is held against movement relative to the base plates 52 parallel to the shafts 46 by steel balls 58 bearing against the ends of the shafts 46 and adjustably held thereagainst by screws 60 threaded through the reinforcing blocks 38 secured to the side walls 20 of the turntable. The balls 58 are positioned in apertures 61 extending through the side walls 20 so as to project from the inner surfaces of such side walls into contact with the shafts 46. The apertures 61 provide limited clearance for the balls 58 so that the balls have limited movement when the side walls 20 of the platform 10 carrying the screws 60 move vertically relative to the ends of the shafts 46 during a weighing operation. As the weight is increased on the platform 10, the balls roll upwardly on the inner ends of the screws 60. Such movements of the side walls 20 relative to the shafts 46 is, however, of the order of a few thousandths of an inch during weighing operations so that movement of the balls is relatively small. It will be understood that the ends of the shafts 46, as well as the ends of the adjusting screws 60, will be suitably hardened and ground flat and parallel to each other.

Figure 1:
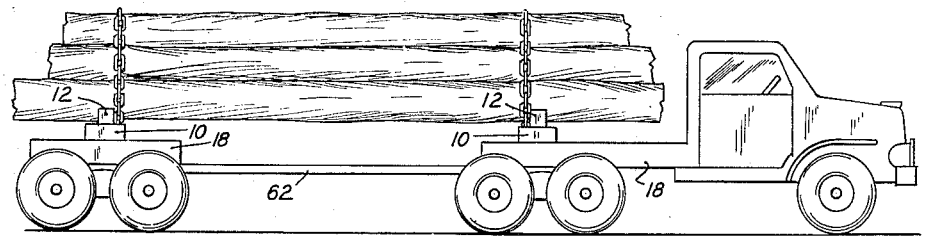
Fig. 1 is a side elevation of a logging truck showing one environment in which the scale mechanism of the present invention finds utility.
Figure 4:
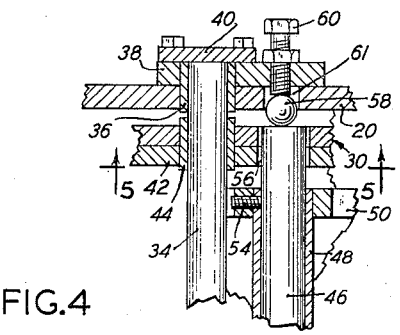
Fig. 4 is a fragmentary horizontal section on an enlarged scale taken approximately on the line 4—4 of Fig. 3.

The forces causing the trailer to follow the truck in Fig. 1 are transmitted through the logs when the truck is being driven in a loaded condition as the draft bar 62 of the trailer is either allowed to slide longitudinally in the trailer or has a lost motion sliding connection therein, known as a compensating head. The forces transmitted through the logs are thus imparted to the truck and trailer through the balls 58. Thus the forces in a direction laterally of the platform 10 due to moving the trailer by the logs are transmitted from such platforms to the frames of the truck and trailer directly through the balls 58 and shafts 46 to the standards 50 carried by the truck frame without being transmitted through the scale arms 30 and 32. That is to say, the balls 58 constitute bearing members positioned between the depending sides of the platform and the supporting structure therefor which is secured to the truck frame. It will be noted that the arms 30 and 32 float on the shafts 34 and 46 in the sense that they are free to move longitudinally of such shafts except as such movement is restrained by the bushings 36 and 44. Preferably a limited clearance is provided between the ends of such bushings at the opposite ends of the shafts 34 so that the arms have limited movement longitudinally of the shafts 34 and shafts 46.

The arms 30 and 32 taper to narrow portions at their inner ends 64 and 66, respectively. The end 64 of the arm 30 is narrower than that of the end 66 of arm 32 and is received inside of the side walls of the end 66 of the arm 32 below a horizontal plate 68 carried on such side walls. A ball 70 is positioned in a depression in the end 64 of the arm 30 and contacts the plate 68, it being understood that the plate 68 will have a hardened and ground surface. A force measuring cell 72 is positioned above the plate 68 and between such plate and a plate 74 secured to a pair of the reinforcing bars 26. The force measuring cell has knife edges on its upper and lower surfaces engaging in suitable grooves in the upper surface of the plate 68 and the lower surface of the plate 74. It will be apparent that the weight on the turntable platform 10 will cause the inner ends 64 and 66 of the arms to be urged upwardly with a force proportional to such weight. The ratio of the weight on the turntable platform to the force on the cell in the particular structure is 8 to 1, but other ratios are possible.

A horizontal line through the crest of the lower knife edge of the force measuring cell 72 passes through the contacting surfaces of the upper portions of the shafts 46 and holes 56 and also passes through the shafts 34 about one half of the distance between the center of the shafts and the lower surfaces of the shafts. Under these conditions and with the floating arms previously described, the compressive force on the cells 72 between the knife edges is substantially proportional to the load on the turntable 10 under all conditions of loading and accurate weights are obtained even when the load is considerably unbalanced on either the truck or trailer, or when the vehicle is on uneven ground such as a grade or side hill, or even when the truck is tipped laterally in one direction and the trailer is tipped in the other direction. The effective fulcrum point provided by the shaft 34 and its bearings is somewhat above the effective fulcrum point provided by the shaft 46 and its bearings so that the effective lever arm between such fulcrum points is somewhat increased on the side of the scale supporting the greatest load when the truck or trailer is tipped about its longitudinal axis. This tends to compensate for the decrease in the component of the total load which is effective on the scale. Also pulling or pushing of the trailer by the truck through the logs and thus through the turntable platform has very little effect on the weight readings as the forces resulting therefrom are transmitted directly from the turntable platform to the base plates 52 and frame of the truck through the balls 58, shafts 46 and standards 50 so that a check of weight conditions can be obtained even when the vehicle is moving.

The scale mechanism is preloaded to prevent chattering by a bar 75 bearing against the end 64 of the arm 30 and adjustably secured to one of the reinforcing bars 26. This preloading has no effect on weight readings greater than the applied preload.

The particular force measuring cell 72, indicated in the drawings, is a commercial product which converts a compressive force on the cell into an electric voltage proportional to the force. A suitable electric circuit employed with the cell is also a commercial product and the details of the cell and the circuit form no part of the subject matter of the present invention. A brief explanation is given merely to complete the disclosure. Thus in Fig. 7, a force between the knife edges of a force resisting member 76 moves a magnetic armature 77 relative to the coils 78 so as to increase the inductance of one of such coils and decrease the inductance of the other. The coils 78 are connected in a bridge circuit with similar coils 80 at the weight indicating instrument which may be mounted in the cab of the truck. In such instrument, a similar armature 81 is moved relative to the coils 80 by a micrometer dial 82 until a null reading is obtained on a meter 84. The dial 82 can be calibrated in weight on the truck or trailer. Sixty cycle sine wave A.C. is applied through the lines L1 and L2 and rectifiers 86 supply D.C. to the meter 84 whenever the bridge is unbalanced. At the dotted portion of the circuit, a rotary switch (not shown) may be employed to connect the indicating portion of the bridge alternately to the cells in the scales on the truck and on the trailer and also to connect the indicating portion of the instrument to a standard reference cell for zeroing the instrument. Other types of force measuring cells for converting a force into an electric signal are also available commercially and may be employed therein instead of the specific cell and circuit described above.

The operation of the scale mechanism of Figs. 1 to 7, inclusive, should be apparent from the above description. Logs are loaded upon the scale bunks 12, indicated in Fig. 1, and such scale bunks each rest upon a bunk turntable 10, which in the structure of the present invention, is a scale platform extending laterally of a logging truck or its trailer. The total weight of the logs is therefor supported by the two scale platforms 10 of Fig. 1. The weight on each platform is transmitted to the outer ends of a pair of scale arms 30 and 32 by the fulcrum shafts 34 extending through the depending side walls 20 of the platform 10 and also through the side plates of the arms 30 and 32. The arms 30 and 32 are pivotally supported between their ends and close to the shafts 34 on fulcrum shafts 46 which are rigidly supported in the standards 50 secured to the base plates 52 and which are in turn secured to the frame of the truck or trailer. The weight on the platform 10 causes the inner ends of the arms 30 and 32 to exert a force upwardly on the force sensing cells 72 which is proportional to the weight on the platform, the arm 30 transmitting its upward force to the arm 32 through the ball 70. Such upward force from the arm 32 is converted into an electric signal by the force sensing cell 72 and electric circuit shown in Fig. 7, and the amount of such force can be determined by adjusting the dial 82 of Fig. 7 until the bridge circuit shown therein is again in balance. It is apparent that the dial 82 can be calibrated in units of weight on the scale platform.

Any force longitudinal of the truck and trailer required to move the trailer with the truck is transmitted through the logs on the bunks 12 and therefore through the scale platforms 10. This force is transmitted directly from the scale platforms to the shafts 46 by the structure most clearly shown in Fig. 4 and is not transmitted through the scale arms 30 and 32. The adjusting screws 60 bear directly against the balls 58 which in turn directly engage the ends of shafts 46. The screws are carried by the depending side walls of the platform 10 and the shafts 46 are secured rigidly to the frame of the truck. Forces laterally of the truck and trailer, due to unbalanced loads, tipping of the truck or trailer, etc., are transmitted through the arms 30 and 32. As stated above, the arrangement of the effective fulcrum points for the arms 30 and 32 tend to compensate for the effect of tipping of the truck or trailer about a longitudinal axis. As described above with reference to Figs. 4 and 5, the shafts 46 have their ends positioned in holes 56 in the side plates of the arms 30 and 32, which holes are of larger diameter than the shafts. The resulting lost motion between the shafts 46 and their bearings in the side plates of the scale arms enables slight motion of the scale platforms laterally of the truck and trailer and enables slight relative motion between the shafts 46 at opposite ends of a scale platform. This relative motion in the case of a rigid truck or trailer frame is not sufficient to materially effect the accuracy of the weight readings and it will be apparent that such relative motion between a shaft and its bearings could be provided between the shafts 34 and their bearings in the arms 30 and 32, or in the depending side walls of the platform 10, instead of between the shafts 46 and their bearings in the arms 30 and 32.

Figure 8:
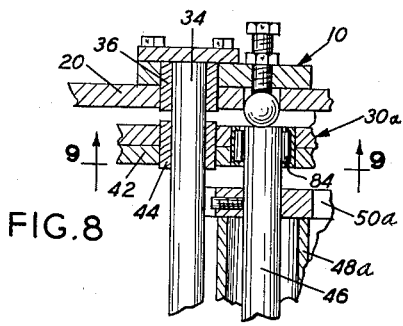
Fig. 8 is a view similar to Fig. 4 showing a part of a modified scale including the scale arm supporting structure at one end of the scale platform.
Figure 9:
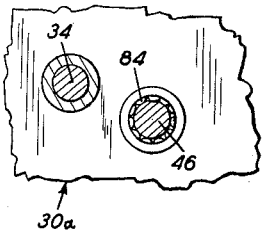
Fig. 9 is a vertical section taken on the line 9—9 of Fig. 8.
Figure 12:
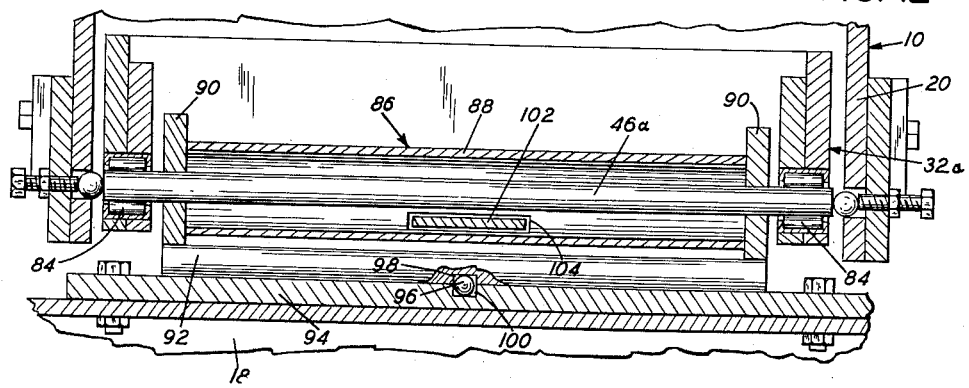
Fig. 12 is a fragmentary vertical section taken on the line 12—12 of Fig. 11.
Figure 10:
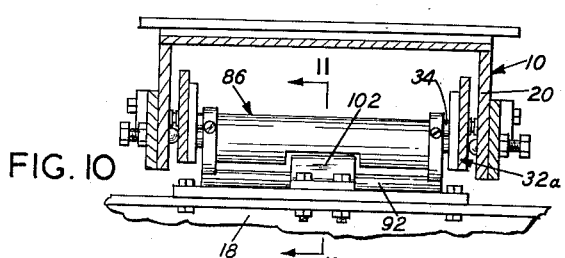
Fig. 10 is a vertical section through the scale shown in Figs. 8 and 9 showing the scale arm supporting structure at the other end of the scale platform.
Figure 11:
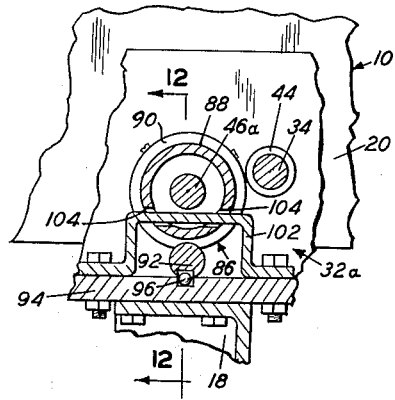
Fig. 11 is a fragmentary vertical section on an enlarged scale taken on the line 11—11 of Fig. 10.

With truck or trailer frames of less rigidity, for example, certain trucks having aluminum frames, relative lateral motion between the shafts 46 at opposite ends of the scale platform of Figs. 1 to 7, due to yielding of the truck frame, may be sufficient to affect the accuracy of a weighing operation in which case the modified scale of Figs. 8 to 12 has certain advantages. In the modified scale of Figs. 8 to 12, the shafts 46 do not have relative lateral motion with respect to the scale arms or the scale platform but instead the support shaft 46 at one end of the platform is mounted for movement laterally of the truck frame. In the modified type of scale shown in Figs. 8 to 12, the bunk turntable or scale platform 10 may be the same as the platform 10 of Figs. 1 to 7, and may be supported upon cross shafts 34 (Figs. 8 and 9). The shafts 34 are received in bushings 36 in the side walls 20 of the platform 10 and in bushings 44 in the side plates of a scale arm 30a (Figs. 8 and 9) and of a scale arm 32a (Figs. 10 to 12). The arms 30a and 32a may be entirely similar to the arms 30 and 32 of Fig. 3, except that the arms 30a and 32a have needle bearings 84 in their side walls and reinforcing blocks 42 instead of the enlarged apertures 56. The needle bearings receive the shafts 46 so that there is no movement of the arms 30a and 32a laterally of their shafts 46, although the arms 30a and 32a are free to turn on the shafts 46. At one end of the platform 10 of Figs. 8 to 12, the shaft 46 (Figs. 8 and 9) is secured in standards 50a directly secured to the frame and connected to each other by a tubular member 48a. This structure may be similar to structure of Figs. 1 to 7. In the structure just described, the scale platform 10 at the end shown in Figs. 8 and 9 does not have any movement laterally of the frame of the truck.

At the other end of the platform 10 of Figs. 8 to 12, which other end is shown in Figs. 10 to 12, the supporting structure does provide for lateral movement between the end of the platform 10 and the truck frame without affecting the accuracy of the scale readings. At such other end of the platform, the shaft 34 is journaled in a bushing 44 in the side plates of the modified scale arm 32a in the same manner as the shaft 34 supporting the scale arm 32 of Figs. 1 to 7. The scale arm 32a of Figs. 10 to 12 may be the same as the scale arm 32 of Figs. 1 to 7, except that it is modified, as described above, to receive a needle bearing 84 which in turn receives a shaft 46a which corresponds to the shaft 46 of Figs. 1 to 7. Instead of being secured within rigid standards such as the standards 50 of Figs. 1 to 7, the shaft 46a is secured in a floating structure 86 including a tubular member 88 having its ends secured to disk members 90 concentric with the tubular member 88 and concentrically surrounding the shaft 46a. The shaft 46a is rigidly secured in the disk members 90 by set screws 92 indicated in Fig. 11. The disk members 90 are notched at their lower peripheral portions, as shown in Fig. 11, to receive a cross shaft 92 which is secured to the disk members 90 in a suitable manner, for example, by welding. The shaft 92 rests upon a base plate 94 which has a flat upper surface and which is secured to the side rails 18 of the frame of the truck or trailer. It will be apparent from Figs. 10 to 12, that the shaft 92 acts as a rocker member to support the shaft 46a through the disk members 90.

The shaft 92 is maintained in a definite position upon the base plate 94 by a steel ball 96 received in registering recesses 98 and 100 in the shaft 92 and base plate 94, respectively. It will be apparent that the shaft 92 may rock on the base plate 94 to enable the distance between the base plate 94 at one end of the scale platform 10 and the base plate at the other end of the scale platform to vary without subjecting the scale mechanism to stresses causing incorrect weight determinations. Under normal conditions with a load on the scale platform 10, the cross shaft 92 is held firmly in engagement with the base plate 94, but under conditions of no load or even with a load upon the platform when the truck is traversing rough terrain, the shaft 92 may accidentally be displaced upwardly so as to be freed from the ball 96. To prevent such accidental displacement, a hold down device may be provided, one form of which is shown in Figs. 10 to 12. Such hold down device is in the form of an inverted U-shaped member 102 extending through slots 104 in the tubular member 88 surrounding the shaft 46a. The hold down member has its legs secured to the base plate 94 and its intermediate portion extending laterally through the tubular member 88 below the shaft 46a. It will be apparent that the hold down member 102 will prevent accidental upward displacement of the shaft 92 with respect to the base plate 94 but that such hold down member 102 may have sufficient clearance in the slots 104 so as to not interfere with rocking movement of the floating structure 86.

The modification of the scale illustrated in Figs. 8 to 12, inclusive, operates in the same manner as the scale of Figs. 1 to 7, except that one end of the scale platform is prevented from having movement laterally with respect to the frame of the truck or trailer while the other end of the scale platform can have relative movement laterally of the frame of the truck by reason of its support upon the rocker shaft 92. The amount of such movement is, however, so small that the accuracy of the weighing mechanism is not substantially affected by changes in distance between the various fulcrums for the scale arms and all forces parallel to the upper surface of the scale platform, either laterally of the truck or trailer, or longitudinally thereof, are transmitted to the frame of the truck or trailer without substantial affect upon the force sensing cell.

Figure 13:
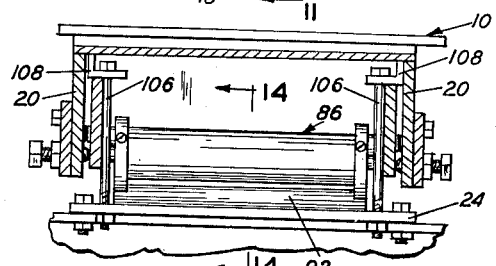
Fig. 13 is a view similar to Fig. 10 showing a further modified scale.
Figure 14:
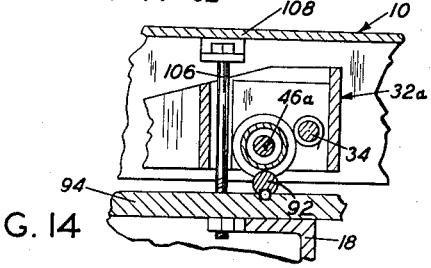
Fig. 14 is a fragmentary vertical section taken on the line 13—13 of Fig. 14.

A further modified type of hold down mechanism is illustrated in Figs. 13 and 14. Instead of employing the inverted U-shaped hold down member 102 of the modification of Figs. 8 to 12, hold down bolts 106 may extend between brackets 108 and the base plate 94, the brackets 108 being secured directly to the side plates 20 of the scale platform 10. Such bolts hold the shaft 92 in contact with the base plate 94 and do not affect the accuracy of the weights upon the scale platform 10, since such platform moves downwardly to relieve any tension on the bolts 106 when a load is placed upon the scale platform. The operation of the further modified form of scale in Figs. 13 and 14 is otherwise the same as that of the modification of Figs. 8 to 12 inclusive.

While I have described the preferred embodiments of my invention, it is to be understood that the details thereof may be varied and it is also to be understood that the invention is not to be limited except by the scope of the following claims.

I claim:

1. A scale mechanism for weighing loads under conditions in which a load receiving platform of said mechanism is subjected to large lateral forces in addition to forces due to the weight of said load, said mechanism comprising a load receiving platform having depending side members rigidly secured thereto, a supporting base for said platform, supporting structures extending upwardly from said base adjacent each end of said platform and rigidly supported on said base and vertically overlapping said depending side members, a pair of scale arms beneath said platform each having an inner end adjacent the center of said platform and outer ends spaced from each other and positioned under opposite ends of said platform, a pair of elongated fulcrum members for each of said arms, one pair of such fulcrum members being positioned adjacent each end of said platform and the fulcrum members of each pair extending laterally of said platform and being spaced longitudinally of said platform, one of said fulcrum members of each pair being secured to and forming part of one of said upstanding supporting structures and the other of said fulcrum members of each pair supporting said depending side members of said platform, force sensing means between said inner ends of said arms and said platform, and means including bearing members positioned below said platform between said upstanding supporting structures and said depending side members for independently of said arms directly transmitting said lateral forces from said platform to said supporting structures in a direction laterally of said platform.

2. A scale mechanism for weighing loads under conditions in which a load receiving platform of said mechanism is subjected to large lateral forces in addition to forces due to the weight of said load, said mechanism comprising a load receiving platform having depending side members, a supporting base for said platform, a pair of scale arms beneath said platform each having an inner end adjacent the center of said platform, a pair of elongated fulcrum members for each of said arms extending laterally of said platform and spaced longitudinally of said platform, one pair of said fulcrum members being positioned adjacent each end of said platform, one of said fulcrum members of each pair being secured to said supporting base and the other of said fulcrum members of each pair having its end received in said depending side members, force sensing means between said inner ends of said arms and said platform, and means including bearing members positioned below said platform between the ends of said one fulcrum members and said depending side members for independently of said arms directly transmitting said lateral forces from said platform to said supporting base in a direction laterally of said platform, corresponding fulcrum members at each end of said platform providing for limited movement of said arms laterally of said corresponding fulcrum members, and said arms having limited movement longitudinally of said fulcrum members, said depending side members being part of a rigid depending flange structure on said platform surrounding said scale arms.

3. A scale mechanism for weighing loads under conditions in which a load receiving platform of said mechanism is subjected to large lateral forces in addition to forces due to the weight of said load, said mechanism comprising a load receiving platform having depending side portions, a supporting base for said platform, a pair of elongated parallel shafts beneath and extending laterally of said platform adjacent each end of said platform one of said shafts of each pair supporting said depending side portions and the other of said shafts of each pair being supported on said supporting base against movement laterally of said platform, a scale arm beneath each end of said platform and having an outer end engaging the shafts of one of said pairs to support said platform, said scale arms having their inner ends adjacent the center of said platform so that a weight on said platform tends to move said inner ends relatively to said platform, means for interconnecting said inner ends of said arms, a force sensing cell between said inner ends of said arms and said platform, and means comprising a bearing member positioned below said platform between the ends of said other shafts and said depending side portions for independently of said arms directly transmitting said lateral forces from said platform to said supporting base in a direction laterally of said platform, said depending side portions being part of a rigid depending flange structure on said platform surrounding said scale arms.

4. A scale mechanism for weighing loads under conditions in which a load receiving platform of said mechanism is subjected to large lateral forces in addition to forces due to the weight of said load, said mechanism comprising a load receiving platform having depending side portions, a supporting base for said platform, a support portion extending upwardly from said supporting base at each end of said platform between said side portions, a pair of scale arms beneath said platform each having an inner end adjacent the center of said platform, said arms having outer ends spaced from each other and positioned under opposite ends of said platform, a pair of parallel shafts adjacent each end of said platform, the shafts of each pair being adjacent each other and spaced longitudinally of said platform, one of said shafts being secured in one of said support portions and the other of said shafts having its ends received in bearing portions in said depending side members, said arms each having bearing portions in their outer ends receiving said shafts, means interconnecting said inner ends of said arms, force sensing means between said inner ends of said arms and said platform, and means including bearing members positioned between the ends of said one shafts and said depending side portions for independently of said arms directly transmitting said lateral forces from said platform to said supporting base in a direction laterally of said platform, one of said bearing portions at each end of said platform providing clearance around its associated shaft for limited movement longitudinally of said platform between said arms and said associated shaft.

5. A weighing mechanism for weighing loads under conditions in which a load receiving platform of said mechanism is subjected to large lateral forces in addition to forces due to the weight of said load, said mechanism comprising a load receiving platform having depending side portions, a supporting base for said platform having upstanding support portions between said side portions, a pair of scale arms beneath said platform each having an inner end adjacent the center of said platform, said arms having outer ends spaced from each other and positioned under opposite ends of said platform, a pair of parallel shafts adjacent each end of said platform, the shafts of each pair being adjacent each other and spaced longitudinally of said platform, one of said shafts of each pair being secured in one of said support portions of said base and the other of said shafts of each pair having its ends received in bearing portions in said depending side members, said arms each having bearing portions in their outer ends receiving said shafts, bearing means interconnecting said inner ends of said arms, force sensing means between said inner ends of said arms and said platform, and means including bearing members positioned between the ends of said one shafts and said depending side portions for independently of said arms directly transmitting said lateral forces from said platform to said supporting base in a direction laterally of said platform, said bearing portions in said arms for said one shafts providing clearance around said one shafts for limited movement longitudinally of said platform between said arms and said one shafts, said arms having limited movement longitudinally of said shafts.

6. A scale mechanism for weighing loads under conditions in which a load receiving platform of said mechanism is subjected to large lateral forces in addition to forces due to the weight of said load, said mechanism comprising a load receiving platform having depending side portions, a supporting base for said platform, a support portion extending upwardly from said supporting base at each end of said platform between said side portions, a pair of scale arms beneath said platform each having an inner end adjacent the center of said platform, said arms having outer ends spaced from each other and positioned under opposite ends of said platform, a pair of parallel shafts adjacent each end of said platform, the shafts of each pair being adjacent each other and spaced longitudinally of said platform, one of said shafts being secured in one of said support portions and the other of said shafts having its ends received in bearing portions in said depending side members, said arms each having bearing portions in their outer ends receiving said shafts, means interconnecting said inner ends of said arms, force sensing means between said inner ends of said arms and said platform, and means including bearing members positioned below said platform between the ends of said one shafts and said depending side portions for independently of said arms directly transmitting said lateral forces from said platform to said supporting base in a direction laterally of said platform, said support portion at one end of said platform being secured against movement relative to said supporting base and said support portion at the other end of said platform being supported on said base for movement of its upper portion relative to said base in a direction longitudinally of said platform, said depending side portions being part of a rigid depending flange structure on said platform surrounding said scale arms.

7. A scale mechanism for weighing loads under conditions in which a load receiving platform of said mechanism is subjected to large lateral forces in addition to forces due to the weight of said load, said mechanism comprising a load receiving platform having depending side portions, a supporting base for said platform, a support portion extending upwardly from said supporting base at each end of said platform between said side portions, a pair of scale arms beneath said platform each having an inner end adjacent the center of said platform, said arms having outer ends spaced from each other and positioned under opposite ends of said platform, a pair of parallel shafts adjacent each end of said platform, the shafts of each pair being adjacent each other and spaced longitudinally of said platform, one of said shafts being secured in one of said support portions and the other of said shafts having its ends received in bearing portions in said depending side members, said arms each having bearing portions in their outer ends receiving said shafts, means interconnecting said inner ends of said arms, force sensing means between said inner ends of said arms and said platform, and means including bearing members positioned below said platform between the ends of said one shafts and said depending side portions for independently of said arms directly transmitting said lateral forces from said platform to said supporting base in a direction laterally of said platform, said support portion at one end of said platform being secured against movement relative to said supporting base and said support portion at the other end of said platform being supported on said base for rocking movement on said base to provide for movement of its upper portion relative to said base in a direction longitudinally of said platform, said depending side portions being part of a rigid depending flange structure on said platform surrounding said scale arms.

8. A scale mechanism for weighing loads under conditions in which a load receiving platform of said mechanism is subjected to large lateral forces in addition to forces due to the weight of said load, said mechanism comprising a load receiving platform having depending side portions, a supporting base for said platform, a support portion extending upwardly from said supporting base at each end of said platform between said side portions, a pair of scale arms beneath said platform each having an inner end adjacent the center of said platform, said arms having outer ends spaced from each other and positioned under opposite ends of said platform, a pair of parallel shafts adjacent each end of said platform, the shafts of each pair being adjacent each other and spaced longitudinally of said platform, one of said shafts being secured in one of said support portions and the other of said shafts having its ends received in bearing portions in said depending side members, said arms each having bearing portions in their outer ends receiving said shafts, means interconnecting said inner ends of said arms, force sensing means between said inner ends of said arms and said platform, and means including bearing members positioned below said platform between the ends of said one shafts and said depending side portions for independently of said arms directly transmitting said lateral forces from said platform to said supporting base in a direction laterally of said platform, said support portion at one end of said platform being secured against movement relative to said supporting base and said support portion at the other end of said platform being supported on said base for rocking movement on said base to provide for movement of its upper portion relative to said base in a direction longitudinally of said platform, said support portion at said other end of said platform including a cross shaft resting on said base to provide said rocking motion, said cross shaft and base having registering recesses, a hardened steel ball positioned partly in each of said recesses, and hold down means preventing separation of said cross shaft and base, said depending side portions being part of a rigid depending flange structure on said platform surrounding said scale arms.

References Cited in the file of this patent

UNITED STATES PATENTS

| | | |
|---|---|---|
| 1,606,333 | Averill | Nov. 9, 1926 |
| 1,670,597 | Stubbs | May 22, 1928 |
| 1,759,885 | Bousfield | May 27, 1930 |
| 1,887,169 | Ross | Nov. 8, 1932 |
| 2,611,662 | Hadley | Sept. 23, 1952 |

FOREIGN PATENTS

| | | |
|---|---|---|
| 271,314 | Great Britain | May 26, 1927 |